(12) United States Patent
Conner et al.

(10) Patent No.: US 7,876,748 B1
(45) Date of Patent: Jan. 25, 2011

(54) STABLE HASH-BASED MAPPING COMPUTATION FOR A DYNAMICALLY VARYING TARGET SET

(75) Inventors: Michael Haden Conner, Austin, TX (US); George Prentice Copeland, Austin, TX (US); Gregory Alan Flurry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2544 days.

(21) Appl. No.: 09/657,119

(22) Filed: Sep. 7, 2000

(51) Int. Cl.
*H04L 12/28* (2006.01)
(52) U.S. Cl. ...................... 370/389; 370/392
(58) Field of Classification Search .................. 370/400, 370/401, 389, 392, 402, 403; 711/216; 707/206
See application file for complete search history.

(56) References Cited

U.S. PATENT DOCUMENTS

| | | | | |
|---|---|---|---|---|
| 5,025,369 A | 6/1991 | Schwartz | .................... | 364/200 |
| 5,418,953 A | 5/1995 | Hunt et al. | .................. | 395/650 |
| 5,708,659 A * | 1/1998 | Rostoker et al. | ............ | 370/392 |
| 5,764,981 A | 6/1998 | Brice et al. | ................ | 395/671 |
| 5,832,512 A | 11/1998 | Mastors et al. | .............. | 707/202 |
| 5,864,852 A | 1/1999 | Luotonen | ..................... | 707/10 |
| 5,905,862 A | 5/1999 | Hoekstra | ............... | 395/200.32 |
| 5,931,912 A | 8/1999 | Wu et al. | .................... | 709/224 |
| 6,049,808 A | 4/2000 | Talluri et al. | ................ | 707/201 |
| 6,163,879 A * | 12/2000 | Mackey | ...................... | 717/111 |
| 6,243,720 B1 * | 6/2001 | Munter et al. | ............... | 707/206 |
| 6,363,377 B1 * | 3/2002 | Kravets et al. | .................... | 1/1 |
| 6,604,147 B1 * | 8/2003 | Woo | .......................... | 709/240 |
| 6,643,287 B1 * | 11/2003 | Callon et al. | ................ | 370/392 |
| 6,661,787 B1 * | 12/2003 | O'Connell et al. | .......... | 370/389 |

OTHER PUBLICATIONS

"Mapping Protocol Requests to Uniform Resource Locators", IBM Technical Disclosure Bulletin, v. 39, n. 5, May 1996.
"Cache Array Routing Protocol (CARP) and Microsoft Proxy Server 2.0", Microsoft Corporation, Jan. 1997.

* cited by examiner

*Primary Examiner*—Robert W Wilson
(74) *Attorney, Agent, or Firm*—Yee & Associates, P.C.; Jeffrey S. LaBaw

(57) ABSTRACT

Mapping a source identifier in a source identifier space to a target identifier in a target identifier space using a hash-based computation that is stable over time with respect to a change in the number of target identifiers. A data item identifiable by a source identifier is associated with some type of computational resource that is represented by a target object identifiable by one or more target identifiers. The set of target objects is dynamically variable. After hashing the source identifier to produce an index position of an entry in a table, a target identifier is retrieved from the table entry. Each entry in the table is related to a single target identifier based on a nearness computation that depends upon the table index position of the table entry and a target identifier for the related target.

64 Claims, 12 Drawing Sheets

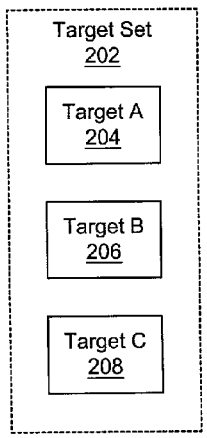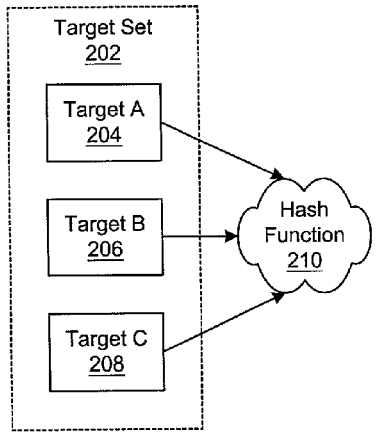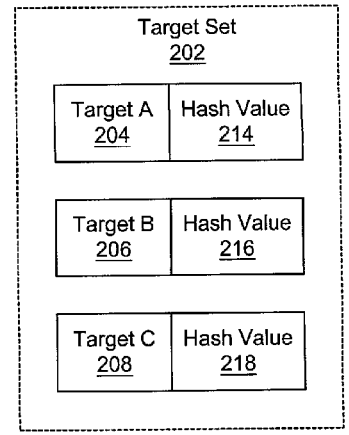
Figure 2A
Prior Art
Figure 2B
Prior Art
Figure 2C
Prior Art
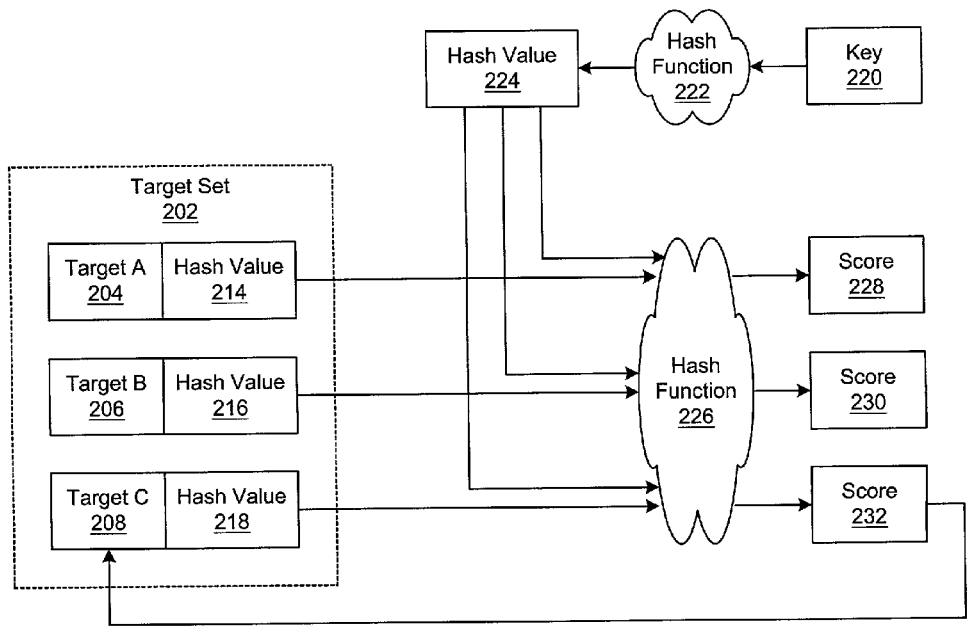
Figure 2D
Prior Art

STABLE HASH-BASED MAPPING COMPUTATION FOR A DYNAMICALLY VARYING TARGET SET

BACKGROUND OF THE INVENTION

1. Field of the Invention

The present invention relates to enhancing data access and control in an improved data processing system. Still more particularly, the present invention provides for resource optimization in data processing systems via a stable hashing mechanism.

2. Description of Related Art

Effective data management requires efficient storage and retrieval of data. A variety of techniques for information storage and retrieval are well known, including a technique known as "hashing". In a typical hashing implementation, an inputted datum is used as a key for retrieving information associated with the key. The information is stored in a data structure, which is usually some form of a table. Given a specific key, a hash function computes an index into the table based on the key, and the associated information is then stored or retrieved from the location indicated by the computed index. In other words, the hash function "hashes" the key, in effect mapping the key value to an index value. Many keys may map to the same computed index, which may cause resource collisions in some implementations, and these collisions may be resolved using a variety of well known techniques. If the hashing function is easily computable and provides an even distribution of the keys across the range of mapped values, then hashing may provide an efficient storage mechanism.

All information storage and retrieval techniques strike a balance between the amount of storage resources that are used to store the information and the speed by which the information is stored and retrieved from the storage resources. In the typical storage implementation noted above, hashing provides a methodology in which an increased amount of storage can be used to increase access speed. A typical hashing implementation does not utilize some of its allocated storage resource in return for a quick manner of storing and retrieving information in its storage resource. While a hash function should distribute the keys across the entire range of table indices, a typical hash implementation does not ensure that all hash table entries are used in any given period of time.

In general, hashing can be interpreted as providing a methodology for mapping a source identifier (ID) to a target ID in order to obtain an association between information identifiable by the source ID and other resources or information identifiable by the target ID. In other words, a hash function maps identifiers between ID spaces. The inputted values into a hash function can be viewed as representing entities in a source ID space while the outputted values from a hash function can be viewed as representing entities in a target ID space. A properly chosen hash function can provide an efficient mechanism for mapping values from the source ID space to values in the target ID space.

Specifically, in a typical storage application, the target ID is an index into an entry in the hash table, and the hash table entry has previously been associated with a target resource. After mapping the key to the target ID, i.e. hash table index, the information in the entry of the hash table is used to determine a storage location for storing or retrieving information associated with the key. The location may be the hash table entry itself, or the hash table entry may have some type of pointer or other identifier that points to a storage location, object, or resource.

Viewed in this broad manner, a hash function allows information to, from, or about the source entity to be associated with information to, from, or about the target entity. Assuming that the target entity is some type of computational resource, then the source ID becomes associated with a target ID, which then performs some type of computational process on behalf of the entity represented by the source ID. The computational process is usually either a storage process or a routing process. In either case, a hash function can be viewed as assisting a type of distributional process.

Hash computations are frequently implemented for distributing computational resources. For example, it is desirable in Web-based applications to route requests from clients to servers so that, once a request is routed from a particular client to a particular server, all requests from that client will be routed to the same server. Given a unique ID for the particular client and a unique ID for the particular server, a hash computation may be employed to map incoming requests from the client to the same server for the duration of the client session. This type of process has been termed "hash routing" or "hash-based routing" and may be applied to a variety of Web-based applications, such as the caching of Web content in an array of cache servers.

All hashing functions are generally required to provide an even or fair distribution of source IDs over the target ID space in order to perform the distribution of computational resources. Otherwise, the distribution is clumpy and must be corrected or compensated, which slows down the distribution computation and defeats a major advantage of employing a hashing function. In order to achieve acceptable distribution of source IDs over the entire target ID space, a typical hashing implementation assumes that the set of target resources will remain unchanged, and hence, the target ID space is expected to be static.

The size of the target ID space is then used as a computational parameter in several aspects because of this assumption about the static nature of the target ID space. For instance, an initial hash table may be allocated at a predetermined size that matches the expected size of the target ID space, and the expected size of the target ID space is also used as a parameter within a hash function. By assuming that the predetermined size of the hash table matches the size of the target ID space, a typical hash function can be assured that it fairly distributes the source IDs over the target ID space if it fairly distributes the source IDs over the hash table.

At some point in time, though, it may be determined that the capacity of the hash table should be increased or decreased to accommodate a different target ID space for some reason. If it is determined that the size of the hash table should be changed, then the parameter within the hash function that determines the size of the target ID space must also be changed, thereby manifesting a change in the behavior of the hash function in mapping the source IDs over the newly defined target ID space.

In order to maintain the integrity of the entire process, the source IDs must be remapped to different hash table indices using the newly defined hash function, eventually resulting in the previous hash table being replaced by a new hash table. Hence, resizing the hash table causes a large performance penalty to be paid when the target ID space is changed. Most implementations of hashing algorithms assume that the set of target resources will remain relatively unchanged and accept a performance penalty when the set of target resources is changed.

In many data processing systems, though, the amount of computational resources varies over time. Continuing the same example of client-to-server mapping, if a server fails or the overall capacity of the system changes, e.g., due to the addition of another server, the size of the target ID space also changes. In order for the system to be able to distribute the client requests evenly over the new set of servers, the hash computation must be able to map the client IDs, i.e. source IDs, evenly over the newly redefined server ID space, i.e. larger or smaller number of target IDs. However, one would like to avoid a scenario in which all of the client IDs are remapped to different server IDs using a new hash function. Otherwise, subsequent requests from a particular client would no longer be routed to the same server that was receiving those requests prior to the redefinition of the server ID space. For example, if the servers perform caching operations for clients, one desires to maintain an affinity between a particular user's requests and a particular server in order to efficiently cache information for the client in the server. If the client-to-server mapping is not stable, then when a server is added or removed, it would be very disruptive as most of the cached information would need to be reaccessed.

Hence, the use of hashing techniques may be impractical when the number of mapped computational resources varies over time. In some solutions, compensation mechanisms and rules have been implemented. Other solutions have involved coordination across mapping points, such as shared mapping tables. These solutions can be complex, difficult to implement, and not sufficiently scalable. For example, one type of caching algorithm, the Cache Array Routing Protocol (CARP) algorithm, greatly degrades its performance as the number of caching servers increases.

Therefore, it would be advantageous to provide a method and apparatus in which a hashing mechanism remains stable while the availability of computational resources varies over time, e.g., the mechanism is stable with respect to the assignment of IDs to servers in a dynamically varying set of servers. It would be particularly advantageous if the hashing mechanism had wide applicability to a variety of computational problems with consistent results when executed on a variety of computer platforms.

SUMMARY OF THE INVENTION

The present invention discloses the mapping of a source identifier in a source identifier space to a target identifier in a target identifier space using a stable hash-based computation. An information item identifiable by a source identifier is to be associated with some type of computational resource, and the computational resource is represented by a target object identifiable by one or more target identifiers. The set of target objects is dynamically variable, yet the mapping is stable over time with respect to the amount of remapping caused by a change to the set of target identifiers. After hashing the source identifier to produce an index position of an entry in a table, and a target identifier is retrieved from the table entry, thereby mapping the source identifier to the target identifier in a mapping operation whose speed is independent of the number of target identifiers.

The mapping is performed via an intermediate table, herein termed a "targetMap" table, in which each entry contains a target identifier. Other data structures could be substituted for the intermediate table, and other information associated with a target identifier may be stored in the intermediate data structure.

The targetMap table is managed as follows. Each entry in the table is related to a single target identifier, yet each target identifier may be related to more than one table entry, thereby producing a relation between a table entry and a target object. The target that is associated with a particular table entry is based on a "nearness" computation that depends upon the table index position of the particular table entry and a target identifier for the associated target. The nearness computation is performed between each table entry and each target identifier to obtain a fair distribution of relationships between table entries and targets. Targets can be added or removed with minimal impact on the table.

Target objects may have one or more associated target identifiers, the number of which is proportional to a measure of computational capacity of the target resource. Hence, the present invention also incorporates a weighting mechanism into the mapping operation such that source identifiers are mapped to target objects in proportion to the predetermined weight or capacity of the target object.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 2A-2D depict the CARP algorithm for caching Internet-based content;

DETAILED DESCRIPTION OF THE INVENTION

Figure 1A:
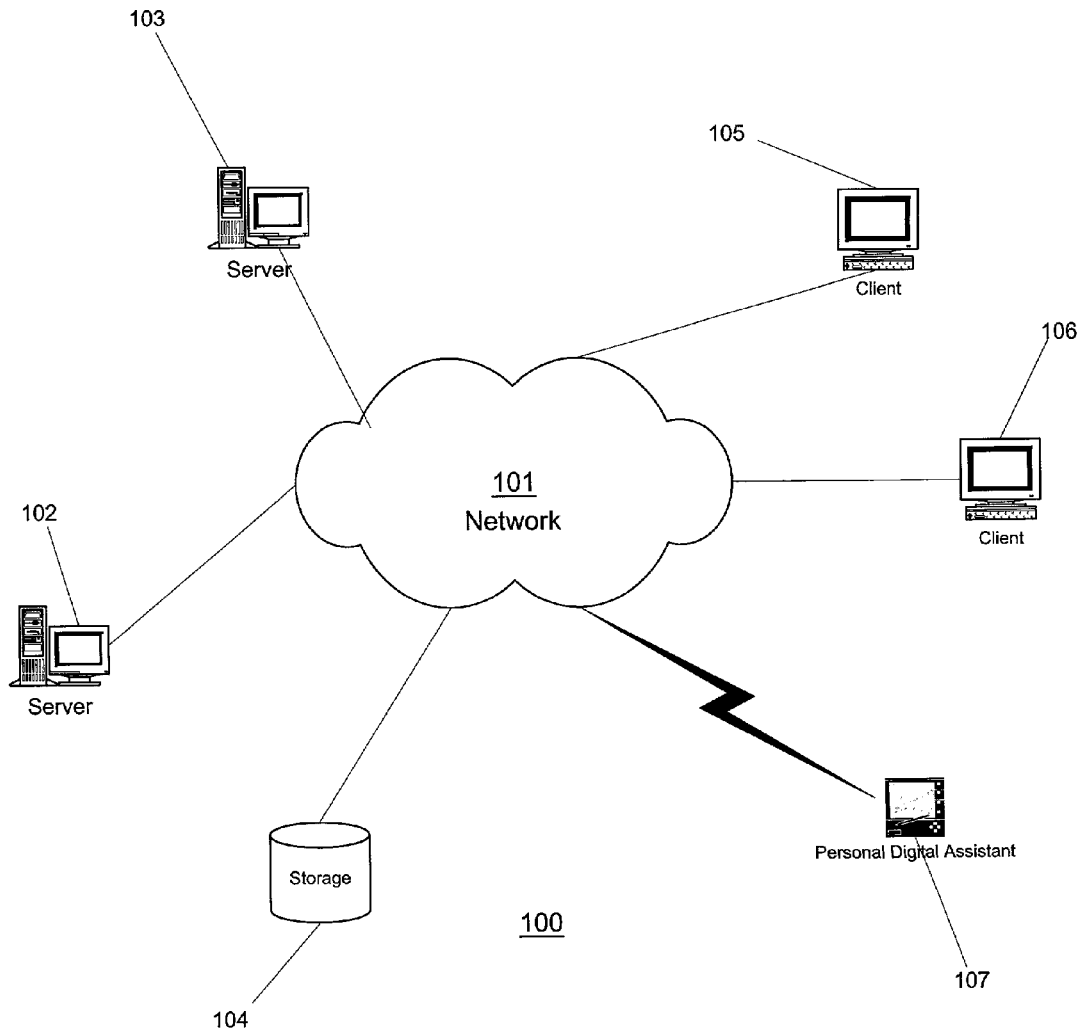
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A.

Figure 1B:
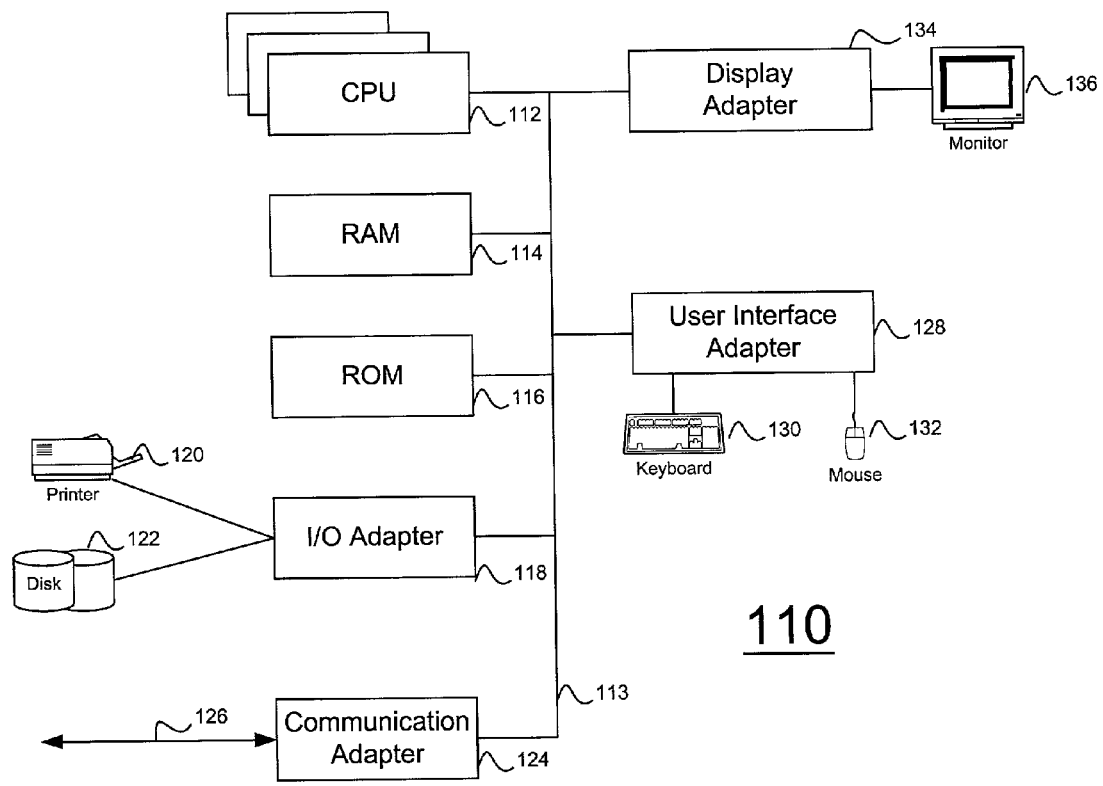
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 110 contains one or more central processing units (CPUs) 112 connected to internal system bus 113, which interconnects random access memory (RAM) 114, read-only memory 116, and input/output adapter 118, which supports various I/O devices, such as printer 120, disk units 122, or other devices not shown, such as a sound system, etc. System bus 113 also connects communication adapter 124 that provides access to communication link 126. User interface adapter 128 connects various user devices, such as keyboard 130 and mouse 132, or other devices not shown, such as a touch screen, stylus, etc. Display adapter 134 connects system bus 113 to display device 136.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention. In addition to being able to be implemented on a variety of hardware platforms, the present invention may be implemented in a variety of software environments. A typical operating system may be used to control program execution within the data processing system.

The present invention may be implemented on a variety of hardware and software platforms, as described above. More specifically, though, the present invention is directed to providing a hash-based computation that can be used to map values in a source ID space to values in a target ID space comprising a dynamically varying target set. The present invention may be used in a variety of computational applications.

Before describing the present invention in more detail, though, a prior art algorithm, Cache Array Routing Protocol (CARP), is described in order to provide a background for evaluating the operational efficiencies and other advantages of the present invention.

With reference now to FIGS. 2A-2D, block diagrams depict the CARP algorithm for caching Internet-based content. CARP uses hash-based routing to provide a deterministic request resolution path through an array of proxies. For any given Uniform Resource Locator (URL) request, a requesting device, such as a browser, can determine the location of the requested information within the cache array. In this manner, a set of proxy servers can serve as a single logical cache.

FIG. 2A shows target set 202 containing targets 204-208, which could be a set of proxy servers. FIG. 2B shows hash function 210 accepting the target identifiers for each of the targets in target set 202 as input, and hash function 210 generates a hash value for each of the targets. FIG. 2C shows that hash values 214-218 are associatively stored with each of the targets 204-208. A hash value would be generated for each of the targets when the system is initialized or when a new target is added to the target set.

FIG. 2D illustrates a series of steps in which a key, such as a URL, is mapped to a particular proxy server in the target set through a type of hash routing provided by CARP. Key 220 is hashed by hash function 222 into hash value 224, which is then mathematically combined through hash function 226 with each of the hash values 214-218. The result from each of these hash operations is a value which is regarded as a score that indicates the level of association between the key and a particular target. Scores 228-232 are then compared to each other to find the lowest or highest score, and the target which produced the lowest or highest score is regarded as the target with which the key should be associated.

In the example, target 208 produced the best score, so assuming that key 220 is a URL, then the URL would be sent to the proxy server represented by target 208. At some later point in time, if target 208 is removed from the target set, e.g., if the proxy server represented by target 208 fails, then key 220 would be evaluated against the remaining targets, and the next highest score would associate a different target with key 220. At any given time, the URLs and the server identifiers should be stable, so the CARP methodology produces a deterministic association between the keys and a set of target servers. When a server is added or removed from the target set, a minimal amount of work is required to adjust the necessary data structures.

The CARP methodology, however, has a major disadvantage because of its poor ability to scale with additional targets. As shown in FIG. 2D, every time that a URL is to be sent to a server, each URL is evaluated against each server in the target set, which requires an evaluation of hash function 226 for each server in combination with the inputted key. As the number of servers grows, the number of mathematical computations performed for each key, i.e. evaluations within hash function 226, grows linearly. The performance of the CARP algorithm degrades as the number of servers increases.

In contrast, the present invention can map a key to a particular target in a constant time that is independent of the number of targets in the target set. Other advantages of the present invention will be explained in more detail further below.

It should be noted that the CARP algorithm was designed for implementing an array of cache servers, yet it may have utility in other applications. The present invention, however, is designed for use in a wide variety of applications that may require a stable hash computation for a dynamically varying target set. Hence, the following description of the present invention is not restricted to a particular application, and the terminology is purposefully chosen to illustrate the broad applicability of the invention.

With reference now to FIGS. 3A-3D, a set of diagrams depict the manner in which the present invention manages an intermediate table or array, termed a "targetMap table" or simply "targetMap", that is eventually used to map keys from a source ID space to a target ID space. FIGS. 3A-3D show the manner in which the targetMap table is managed, while the manner in which the targetMap table is used to map a key to a target is deferred to FIGS. 3E-3F.

Figure 3A:
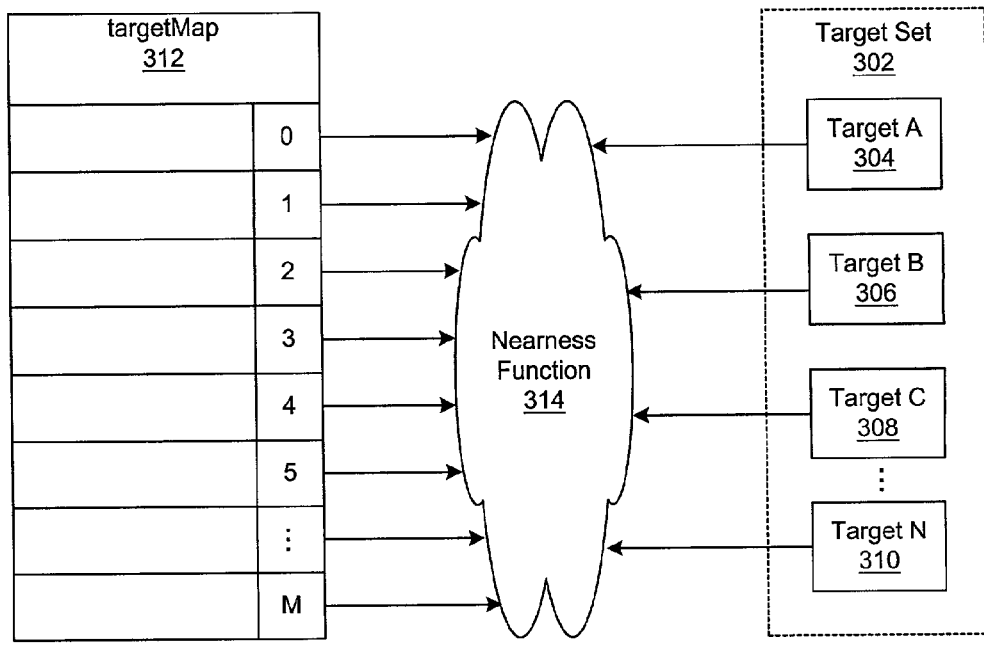
FIGS. 3A-3D depict the manner in which the present invention manages an intermediate table, termed a "targetMap", that is eventually used to map keys from a source ID space to a target ID space.
Figure 3B:
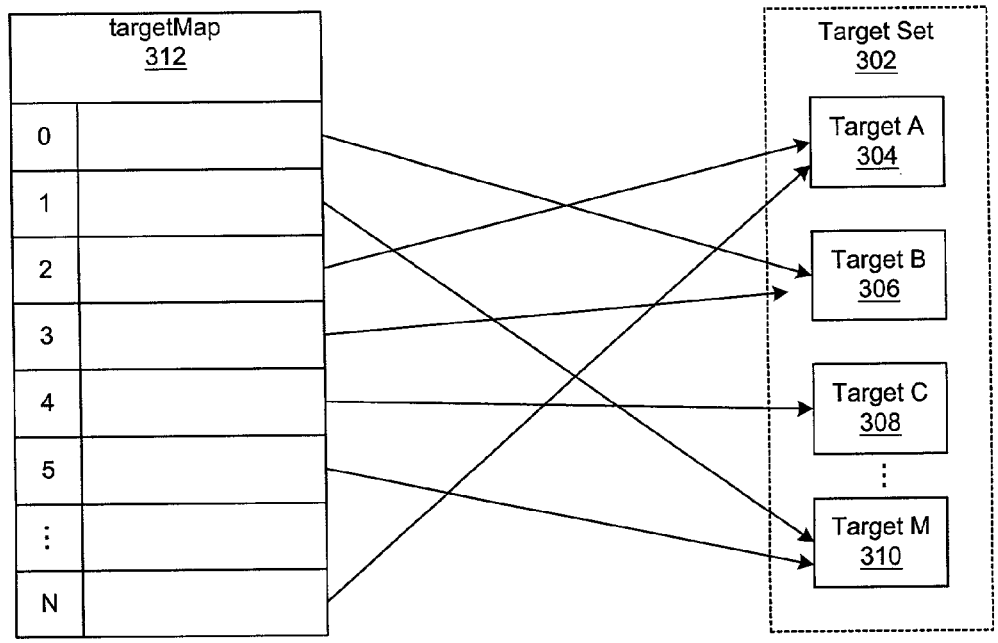

FIG. 3A and FIG. 3B depict the manner in which the targetMap table is initially constructed. Target set 302 has initial targets 304-310, each of which has a target identifier, such as a server name, server number, etc. TargetMap table 312 has a number of entries that may be accessed by an index into the table. The number of entries in targetMap table 312 and the number of targets in target set 302 may vary from several to many thousand depending upon the application. The targetMap table is of fixed but configurable length and is generally specified to have a length that is larger than the number of targets by a small factor, e.g., the number of entries in the targetMap may be four times the number of targets in the target set.

Each entry of the targetMap will be associated or related with a single target from the target set. For example, an entry could contain: a target identifier; information associated with a target; a pointer to information concerning a target; or some other type of data for associating or relating a particular target with a particular entry. The relationship between the targetMap entries and the targets is not necessarily a one-to-one relationship; each targetMap entry is associated or related to a single target, while a given target may be associated or related to more than one targetMap entry.

The target to be associated with an entry in the targetMap table is based on a "nearness" calculation. For each index in the targetMap table, the index value is computed against each target identifier in the target set using nearness function 314. The nearness function receives as inputs: (1) a unique identifier representing an entry within the targetMap, such as an array index or table index; and (2) a target identifier. The results of the nearness function computation produces a single, best value for a particular combination of the target identifier and the index position.

The target identifier which produces the best value for that index position is said to be "nearest" to the entry in the targetMap, and the target identifier is then associated with the entry of the targetMap table at that index position. For example, the target identifier could be stored in that particular entry, or some type of data associated with the particular target could be stored in that particular entry.

Given a goal of using the stable hash computation methodology in a distributed computing environment, the nearness function should have the property that it can be computed on different types of computer platforms yet can produce identical results. A variety of nearness functions could be employed as long as the nearness function produces a fair, even distribution of targetMap indices across the range of targets, i.e. across the target ID space. In other words, a good nearness function has properties similar to a good hash function. An example of a particular nearness function is described in more detail further below with respect to FIG. 6.

After this process is performed for each entry in the targetMap table with the initial set of targets, the entries in the targetMap have an initial set of associations with the targets in the target set, as shown in FIG. 3B.

Figure 3C:
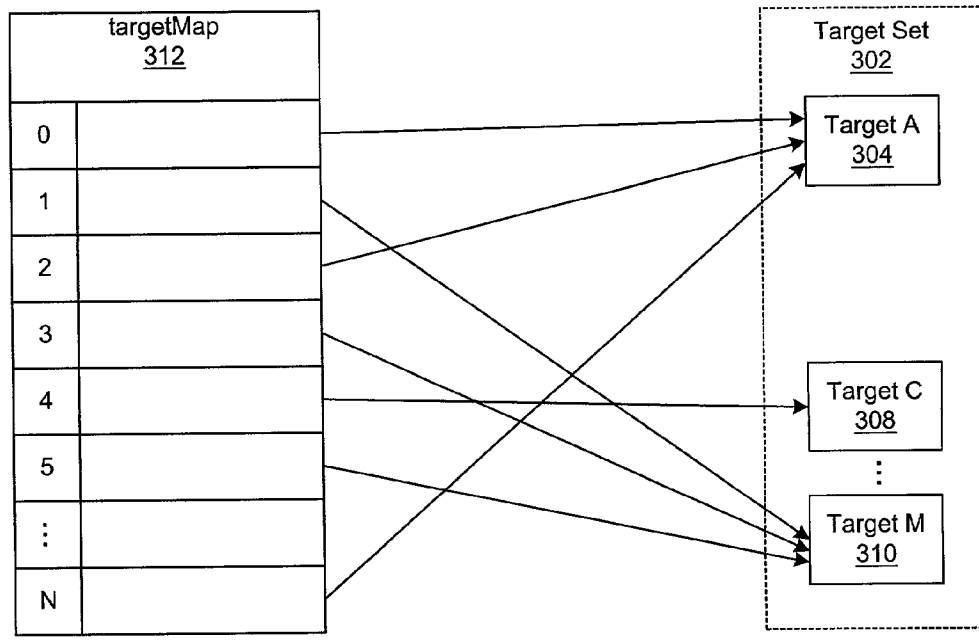

As stated previously, the present invention provides a mapping algorithm for a dynamically varying target set. Hence, at some later point in time, targets may be added or removed from the target set. FIG. 3C depicts the results of removing a target from the target set. Target 306 has been removed from target set 302, and the entries within targetMap 312 that were associated with target 306 have been re-associated with the next nearest targets.

After the initial setup has been completed, a target is associated with a subset of entries in the targetMap. When a target is removed from the target set, each entry in the targetMap table in which the removed target had been specified must be reevaluated to determine the nearest target in the set of remaining targets. Each entry in the subset of entries is then changed to specify the nearest of the remaining targets.

Figure 3D:
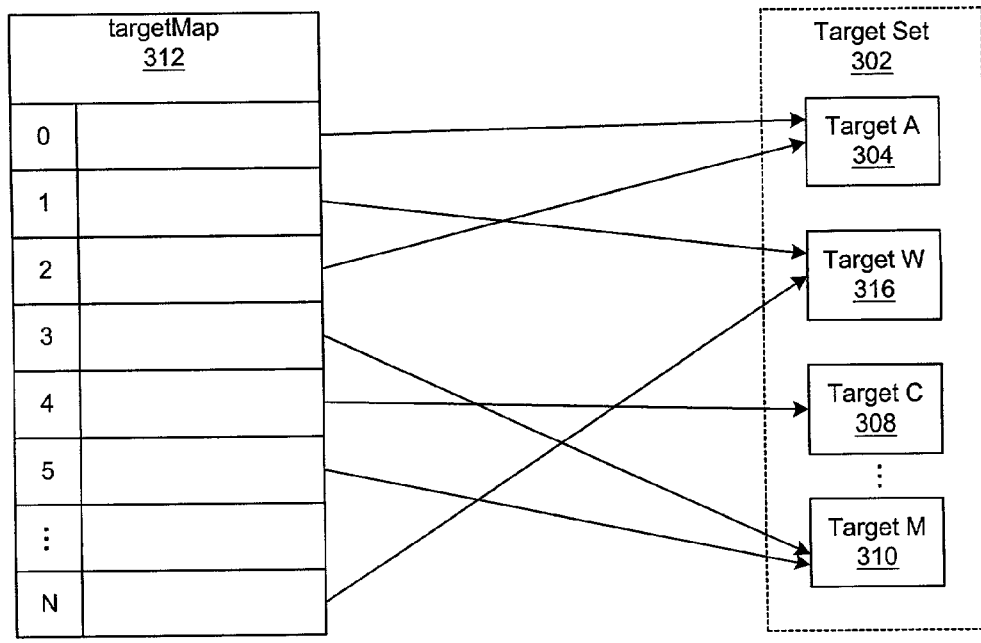

FIG. 3D depicts the results of adding a target to the target set. Target 316 has been added to target set 302, and all entries within targetMap 312 have been reevaluated to find the nearest targets, thereby changing some entries.

After the initial setup has been completed, each entry in the targetMap table is associated with a particular target. When a target is added to the target set, each targetMap entry must be reevaluated to determine the nearest target in the newly modified set of targets. Each entry in the subset of entries is then changed, as necessary, to specify its nearest target in the modified target set.

As noted above, after the initial setup has been completed, a target is associated with a subset of entries in the targetMap. When adding a new target in the target set, a subset of entries in the targetMap will become associated with the new target. Hence, some of the entries in the targetMap are changed so that they are associated with the new target because those entries are nearest as indicated by the nearness function. However, all of the other entries in the targetMap remain unchanged.

Figure 3E:
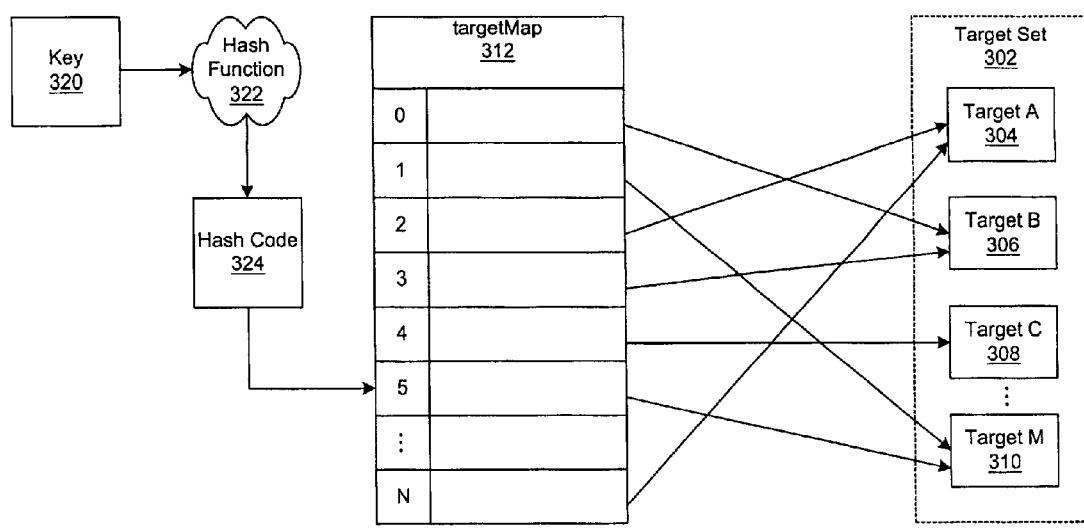
FIGS. 3E-3F depict the manner in which the present invention employs a targetMap table to map keys from a source ID space to a target ID space.
Figure 3F:
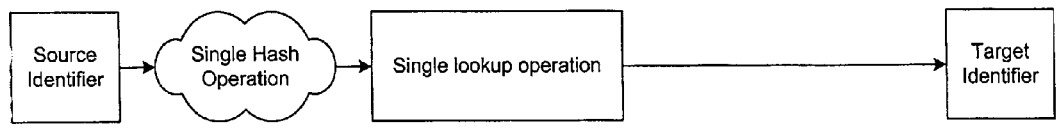

With reference now to FIGS. 3E-3F, a set of diagrams depict the manner in which the present invention employs a targetMap table to map keys from a source ID space to a target ID space. FIG. 3E shows targetMap 302 as previously described with respect to FIG. 3B.

Key 320, which represents some type of identifier from a source object, such as a URL, is input into the stable hash computation process. Key 320 is input into hash function 322, which produces hash code 324. The hash code is used as an index into an entry in targetMap 302, and the targetMap entry specifies its associated target, which is target 310 in this example.

Alternatively, hash function 322 may be replaced by some other type of computation, function, or lookup operation that maps, converts, or transforms key 320 to a location within the targetMap data structure as long the replacement functionality is similar to a hash function. The intention is that the input key is quickly and efficiently mapped, converted, or transformed to a data structure location with a fair and determinative distribution of input values across the data structure locations in a manner similar to a hash function.

In contrast to the CARP algorithm, FIG. 3F emphasizes that an association can be made between a key representing an identifier in the source ID space to a target object representing a target identifier in the target ID space with a single hash operation and a single retrieval or lookup operation.

With reference now to FIGS. 4A-4E, a set of flowcharts depicts the processes that are employed to manage and use the targetMap data structure for mapping keys to targets in accordance with the stable hash computation of the present invention.

Figure 4A:
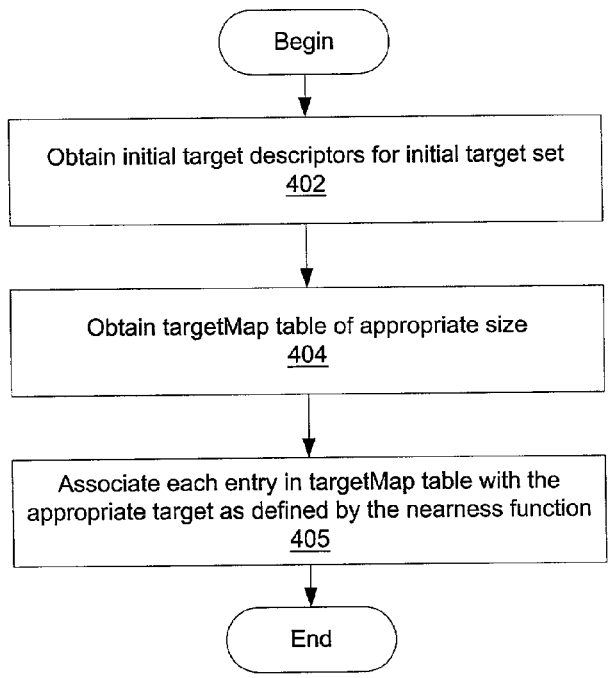
FIGS. 4A-4E depict the processes that are employed to manage and use the targetMap data structure for mapping keys to targets in accordance with the stable hash computation of the present invention.

FIG. 4A depicts a process for initializing the target Map data structure. The process begins by obtaining initial target descriptors for the initial set of targets (step 402). There may be one or more targets in the initial set of targets, each of which is described in an object termed a "target descriptor". A target descriptor may contain any information that is associated with a given target, such as one or more target identifiers, its target weight, and other information. A target identifier may be, without any limitation, a number, an ASCII string, a name, a network physical address, a Uniform Resource Identifier, or some other form of identifier by which the target is uniquely identifiable. The component that is performing the stable hash computation may assign an internal, private target identifier, and the target descriptor may also contain an externally assigned target identifier. One of ordinary skill in the art would recognize that the format of the target identifiers and the manner in which the target identifiers are used may vary, and it should be understood that the identifiers merely represent a logical target unit or a physical target unit within a target ID space.

The process continues by obtaining a targetMap table of appropriate size (step 404). Alternatively, the targetMap may be represented by a data structure that has the following properties: (1) each entry in the data structure has a unique identifier such that the entry identifier provides an input into the nearness function; and (2) the data structure allows some type of simple lookup operation in conjunction with the hash code that is computed from the inputted key when the targetMap is to be used for a mapping operation. If the targetMap is configured as a table, the index into the table provides a unique identifier for a targetMap entry and a mechanism for quickly performing a retrieval from a targetMap entry. If the targetMap is configured using a more complex data structure of targetMap entries, then a pointer to the entry might be used as the identifier of the entry and as the retrieval mechanism. One of ordinary skill in the art will recognize that the targetMap may be configured in a variety of different data structures as long as the implemented data structure provides the necessary properties.

The process then continues by associating each entry in the targetMap with an appropriate target as defined by the nearness function (step 405). The process of initializing the targetMap is then complete. Step 405 is described in more detail with respect to FIG. 4B.

Figure 4B:
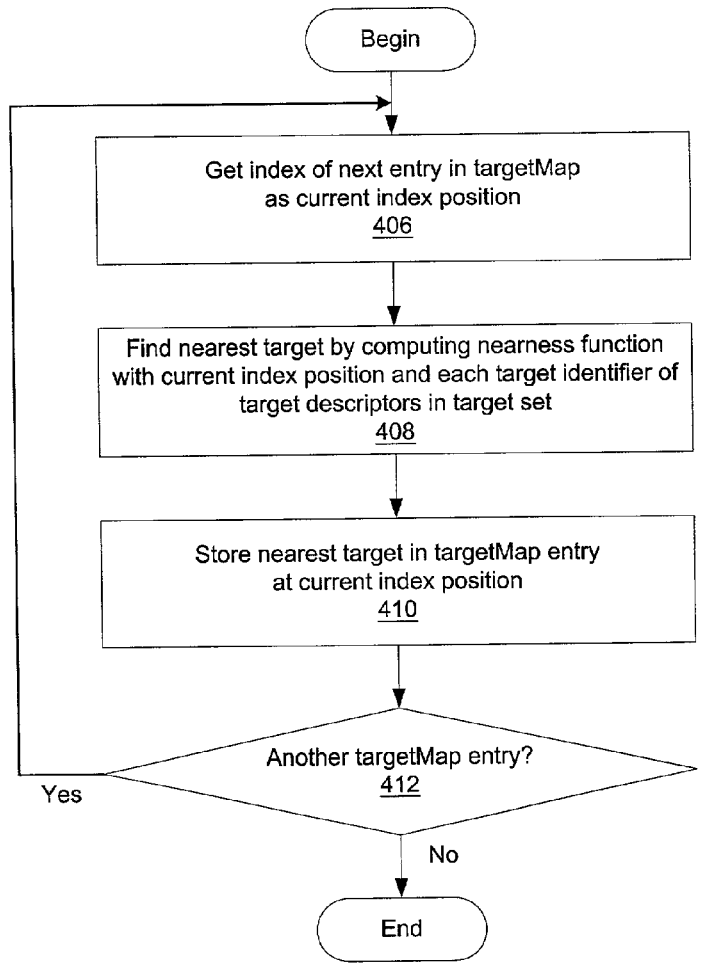

The flowchart shown in FIG. 4B can be used when initializing a targetMap upon startup or when updating a targetMap after a target has been added to the target set because, in both cases, all of the entries in the targetMap must be evaluated against all of the targets in the target set.

A variable that holds the current index position is initialized to the first index into the targetMap table (step 406). The remainder of the process shown in FIG. 4B is then a loop through the indices of the targetMap table. Hence, the first execution of step 406 sets the current index position to the first index, while subsequent executions of step 406 set the current index position to the next available, unprocessed index position.

For the current entry in the targetMap, i.e. for the current index position, the process finds the nearest target by computing a nearness function with the current index position and each target identifier from the targets in the target set (step 408). This step is described in more detail in FIG. 4C.

The process then stores the nearest target, as computed in step 408, into the current targetMap entry as specified by the current index position (step 410). A determination is made as to whether there are other entries in the targetMap which have not yet been processed (step 412). If so, then the process loops back to step 406 to process another targetMap entry. Otherwise, the process is completed.

Figure 4C:
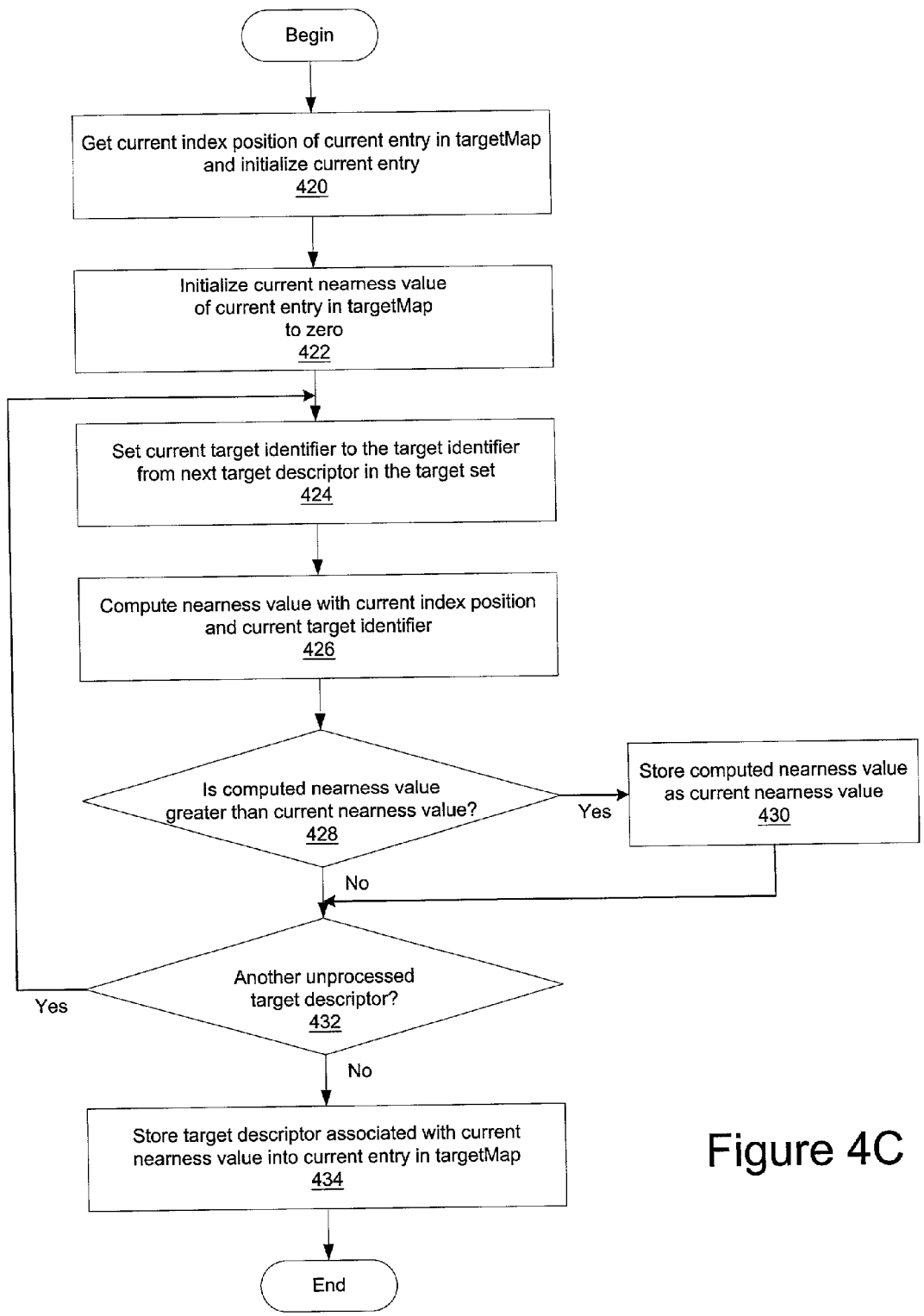

Referring to FIG. 4C, the depicted flowchart is an expansion of step 408 shown in FIG. 4B in which the nearness function is evaluated for all of the entries in the targetMap. FIG. 4C describes the process for computing a nearest target for a single targetMap entry. Hence, the process shown in FIG. 4B can be viewed as an outer loop through all of the targetMap entries, and the process shown in FIG. 4C can be viewed as the inner loop of the process required for a single targetMap entry.

The process begins by getting the current index position of the current entry in the targetMap and initializing the current entry (step 420). The current nearness value of the current entry is also initialized to zero as a basis for subsequent comparisons (step 422).

In order to prepare for the loop through each of the targets in the target set, a variable that holds the current target identifier is initialized to the target identifier from the target descriptor for the first target in the target set (step 424). The remainder of the process shown in FIG. 4C is then a loop through the target descriptors in the target set. Hence, the first execution of step 424 sets the current target identifier to the first target identifier, while subsequent executions of step 424 set the current target identifier to the next available, unprocessed target identifier.

The process continues by computing a nearness value using the index position of the current targetMap entry and the target identifier of the current target (step 426). A comparison is then made between the computed nearness value and the current nearness value for the current entry (step 428). If the computed value is not greater than the currently stored nearness value, then the process merely continues. If the computed value is greater than the currently stored nearness value, then the computed value is stored as the current nearness value (step 430), replacing the old nearness value, which is discarded.

The process then continues by determining whether there is another unprocessed target descriptor (step 432). In other words, a determination is made as to whether the current index position has not been evaluated against all of the targets in the target set. If so, then the process branches back to step 424 to continue processing. If the entry has been evaluated against all of the targets to determine the nearest target, as defined by the nearness function, then the target descriptor that is associated with the nearest target is stored in the current entry of the targetMap (step 434). The process is then complete for the current targetMap entry, and the process may branch back to the outer loop for processing another targetMap entry.

Figure 4D:
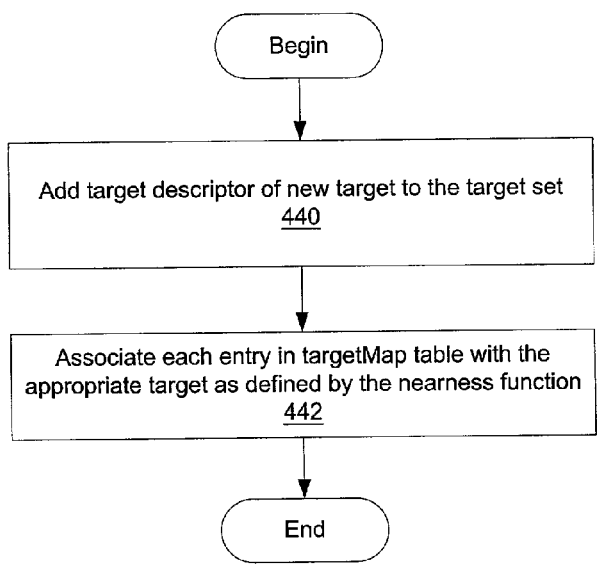

FIG. 4D depicts a process for updating the targetMap data structure when a target is added to the target set. The process begins by adding a new target descriptor for the new target to the target set (step 440). Each entry in the targetMap is then associated with an appropriate target as defined by the nearness function (step 442), and the process is then complete. The number of entries in the targetMap that change their associated targets will depend on the content of all of the target identifiers and the properties of the nearness function. It should be noted that for a large targetMap and a large target set, the addition of a new target to the target set will result in changes only to a small number of entries in the targetMap. The unchanged entries in the targetMap remain stable during and after the addition of the new target to the target set.

The flowchart shown in FIG. 4D is very similar to the initialization flowchart shown in FIG. 4A because, in both cases, all of the entries in the targetMap must be evaluated against all of the targets in the target set. Step 442 in FIG. 4D is similar to step 405 in FIG. 4A, which was previously described with respect to FIG. 4B.

Figure 4E:
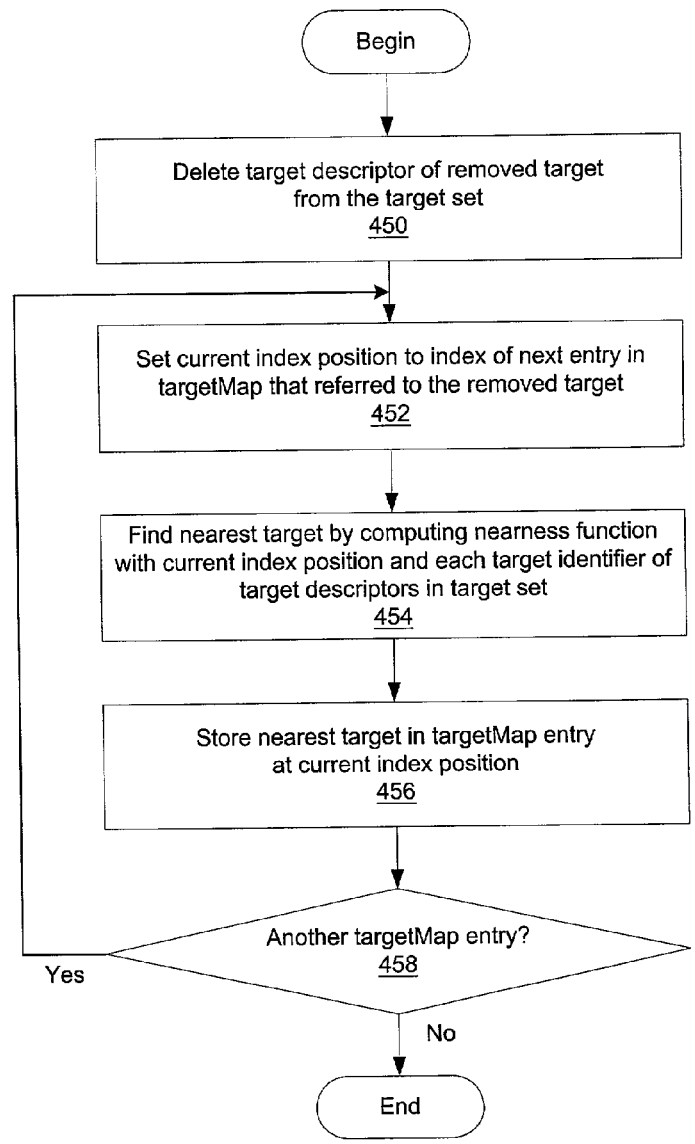

FIG. 4E depicts a process for updating the targetMap data structure when a target is removed from the target set. The flowcharts shown in FIG. 4E and FIG. 4B are very similar. In FIG. 4B, all of the entries in the targetMap must be evaluated against all of the targets in the target set. In FIG. 4E, though, only a subset of the entries in the targetMap are evaluated against all of the targets in the target set. When a target is removed, only the entries in the targetMap at which the removed target had been specified must be reevaluated.

The process begins by deleting the target descriptor for the removed target from the target set (step 450). A variable that holds the current index position is set to the index of the next entry in the targetMap that referred to the removed target (step 452). The remainder of the process shown in FIG. 4E is then a loop through the subset of entries in the targetMap table that referred to the removed target. Hence, the first execution of step 452 sets the current index position to the first entry that referred to the removed target, while subsequent executions of step 452 set the current index position to the next unprocessed entry which referred to the removed target.

For the current entry in the targetMap, i.e. for the current index position, the process finds the nearest target by computing a nearness function with the current index position and each target identifier from the targets in the target set (step 454). This step was described with respect to FIG. 4C.

The process then stores the nearest target, as computed in step 454, into the current targetMap entry as specified by the current index position (step 456). A determination is made as to whether there are other entries in the subset of entries which have not yet been processed (step 458). If so, then the process loops back to step 452 to process another targetMap entry. Otherwise, the process is completed.

Using the methodology provided by the present invention, only a small number of entries in the targetMap table are changed when targets are added or removed, assuming that the nearness function has appropriate properties. As one of the desired properties, the nearness function should provide an even distribution of associations between entries in the targetMap table and targets in the target set. Assuming that the nearness function has this particular property, the nearness function can be employed to distribute targets over the target-Map table in a manner in which the associations are weighted by the targets' respective capacities.

In a given application of the present invention, the targets may or may not be identical in their processing capabilities. For example, the targets may represent servers or routers, and the target set may represent a set or subset of servers or routers within an enterprise. Although many servers or routers within a large enterprise may be identical, it is unreasonable to assume that all of the servers or routers within a given set or subset will be identical. For example, if the present invention is used in an application in which the targets are caching servers within a cache array, some servers may have more storage capacity than other servers, and those servers should received more cached items. If the present invention is used in an application in which the targets are routers, some of the routers may have faster response times, and those routers should receive more routing requests. The present invention incorporates a target's computational capability or capacity into the manner in which keys are distributed from a source ID space to a target ID space.

The present invention provides a weighting capability in the manner in which the targetMap is managed. When a key is received for processing, the manner in which the key is mapped to a target is identical to that described with respect to FIG. 3E; no additional processing is necessary. The capacities of the targets are weighted by associating a proportional number of targetMap entries to the each target according to its weighting. This is described with respect to FIGS. 5A-5C below.

Figure 5A:
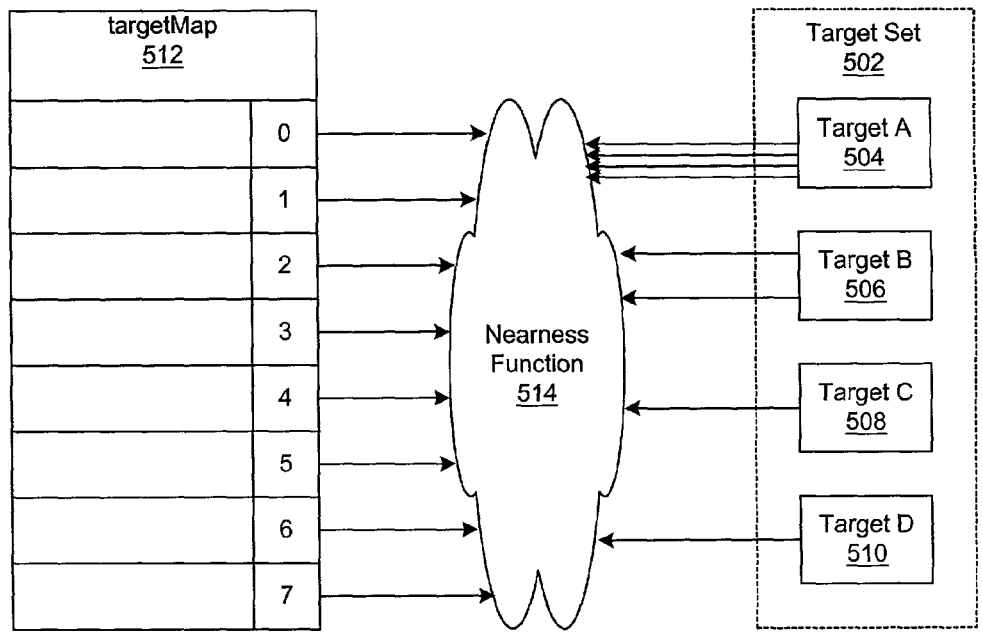
FIGS. 5A-5C depict the manner in which the targetMap table is managed with consideration to weighting the capacities of the targets.
Figure 5B:
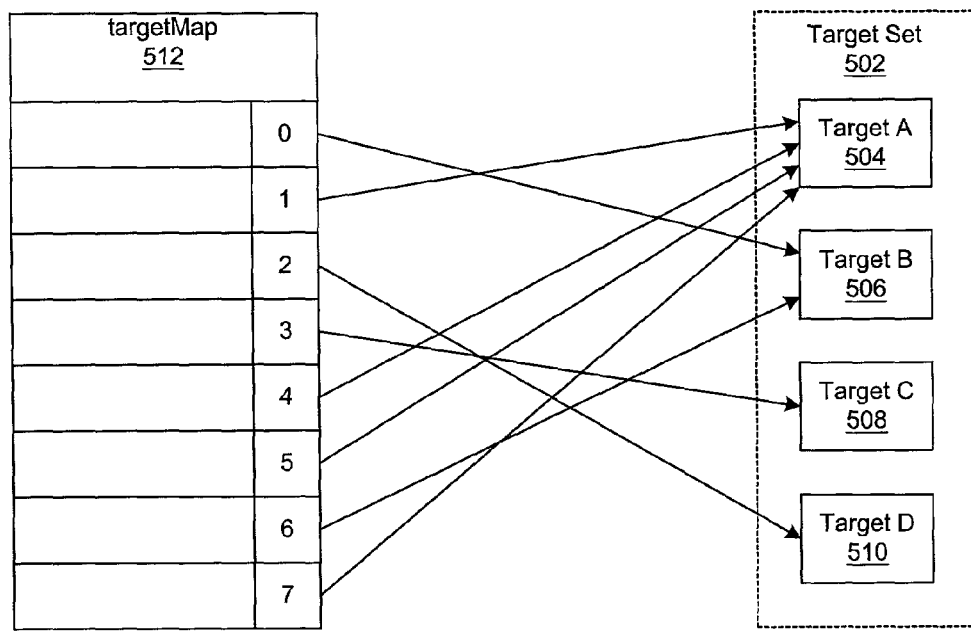
Figure 5C:
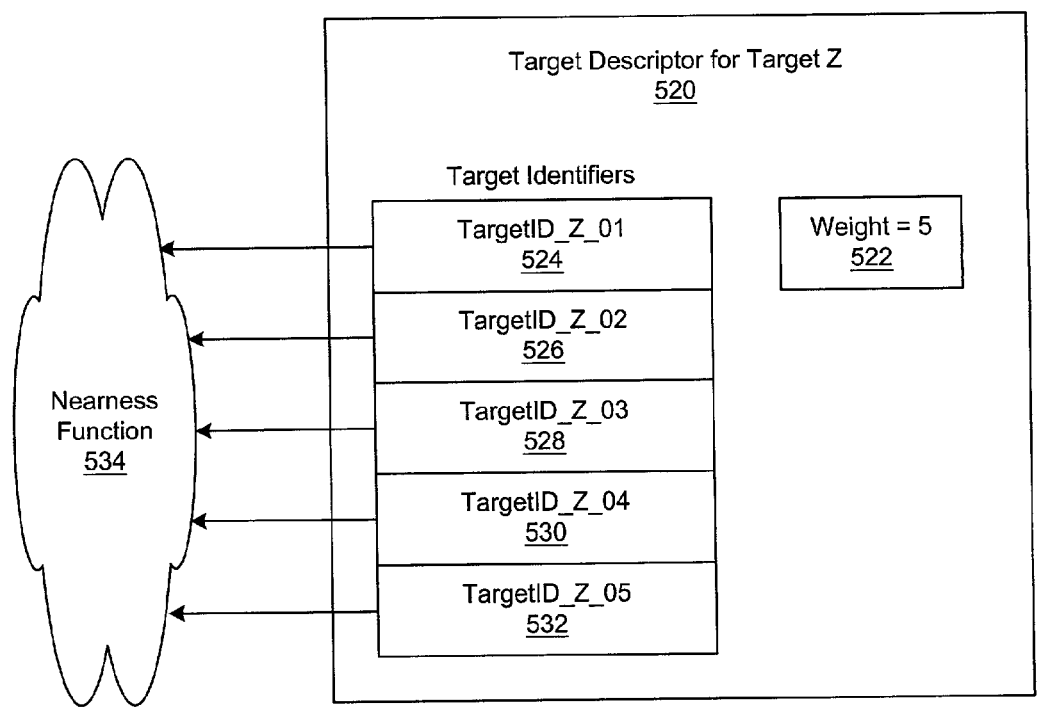

With reference now to FIGS. 5A-5C, a set of diagrams depict the manner in which the targetMap table is managed with deference to weighting the capacities of the targets. FIG. 5A and FIG. 5B are similar to FIG. 3A and FIG. 3B. Target set 502 has initial targets 504-510, and targetMap table 512 has a number of entries that may be accessed by an index into the table. In this example, the number of entries in targetMap table 512 and the number of targets in target set 502 are fixed, but as previously noted, they may vary from several to many thousand depending upon the application.

Each entry of the targetMap will specify a single target from the target set, i.e. an entry will contain a pointer to a target or will contain some other type of data for associating a particular target with a particular entry. However, the relationship between the targetMap entries and the targets is not necessarily a one-to-one relationship. The target to be specified at each entry in the targetMap table is based on a nearness calculation.

In FIG. 3A, each of the targets has a single target identifier, such as a server name, server number, etc. In contrast, each target in FIG. 5A has one or more target identifiers, and the number of target identifiers for a particular target is correlated with the target's capacity.

For each index in the targetMap table, the index value is computed against each target identifier of each target in the target set using nearness function 514. The results of the computation with each target identifier then results in a single, best value for a particular combination of a target identifier and the index position. The target whose identifier produced the best value for that index position is then associated with the entry of the targetMap table at that index position.

In other words, the process of determining a nearest target for a particular targetMap index is the same as previously described except that each target can have multiple identifiers. In essence, the previously described process would be modified to loop through each identifier of a single target's set of identifiers.

After this process is performed for each entry in the targetMap table with the initial set of targets, the entries in the targetMap have an initial set of associations with the targets in the target set, as shown in FIG. 5B. In this example, target 504 had four times the weighting of target 508 or target 510, and target 506 had two times the weighting of target 508 or target 510. As a result, because the nearness function distributes the targetMap entries equally across the target ID space, target 504 has four times the resulting entry associations as target 508 or 510, and target 506 has twice the resulting entry associations as target 508 or target 510.

FIG. 5C depicts an example of a target with multiple identifiers. As previously described, each target in the target set is represented within the data processing application with a unique data element, such as an object instance, table entry, etc. In FIG. 5C, a target is represented by a target descriptor, which was previously described with respect to FIG. 4A.

In this example, target descriptor 520 is created within an application that is implementing the present invention. Target descriptor 520 represents a target external to the application that has an external identifying string "Target Z", which is used by other applications as the name of the target device or target resource. Alternatively, a target descriptor may store external identifiers in other data formats.

Target descriptor 520 also contains weight variable 522 that determines the capacity of "Target Z", which is then used to generate a correlated number of internal target identifiers 524-532 that are stored within target descriptor 520. It should be noted that the value of the weight and the number of target identifiers for a given target are mathematically correlated but not necessarily equal, as is shown in FIG. 5C. In this example, target descriptor 520 contains five target identifiers 524-532 that are used as inputs, at the appropriate time, to nearness function 534.

Each target identifier in the set of target identifiers 524-532 will be used in the evaluations of targetMap indices to determine the nearest target for a particular targetMap entry, as previously described with respect to FIGS. 4A-4E, although there may be multiple target identifiers per target rather than a single target identifier per target.

Figure 6:
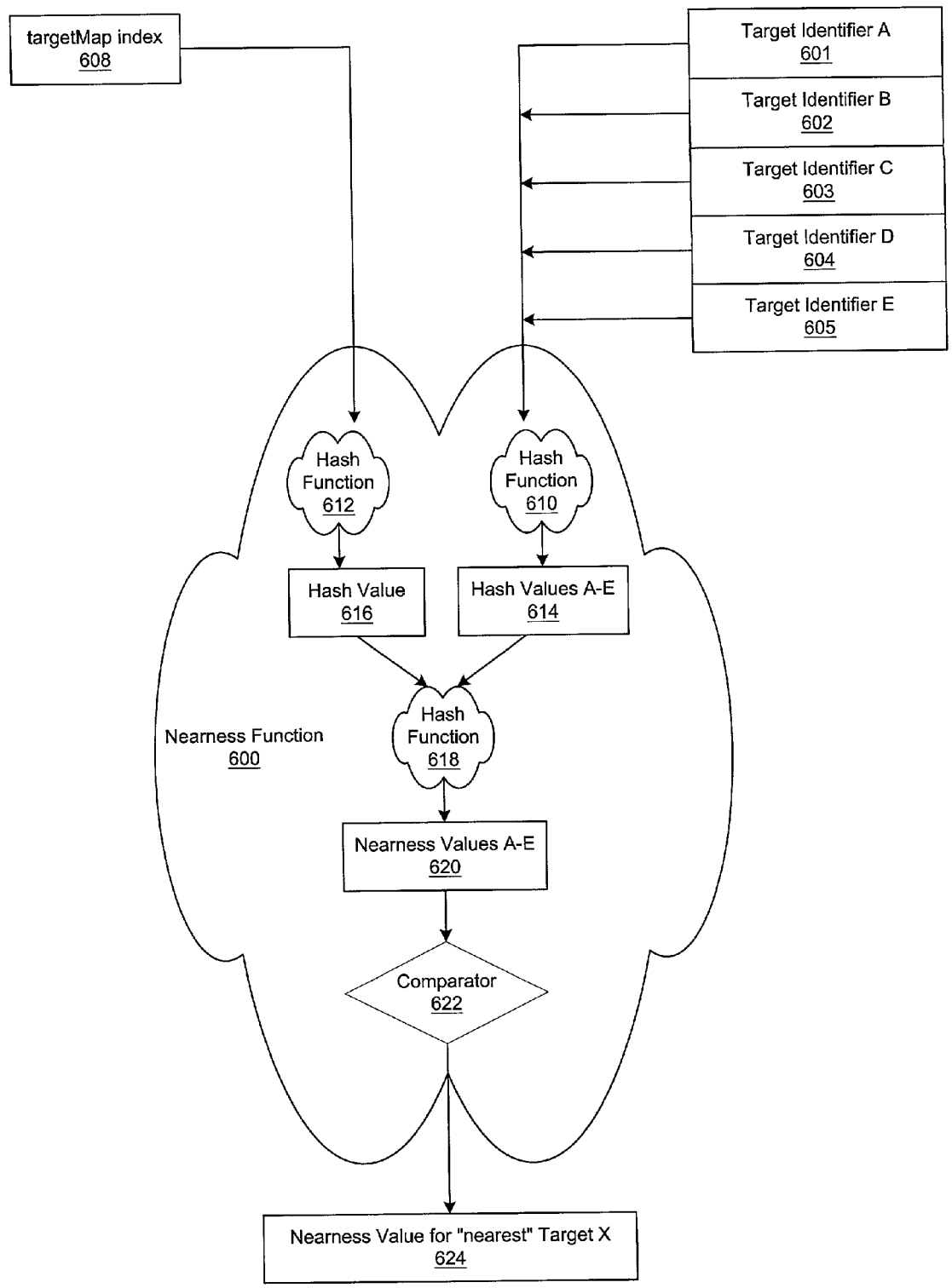
FIG. 6 depicts an example of a nearness function that may be used in accordance with an embodiment of the present invention.

With reference now to FIG. 6, a block diagram depicts an example of a nearness function that may be used in accordance with an embodiment of the present invention. The management of the targetMap relies upon a nearness function that determines which target identifier within a set of target identifiers is the "nearest" for a given index position into the targetMap. Although FIG. 6 depicts one example for the nearness function, one of ordinary skill in the art would appreciate that many different nearness functions could be implemented within an implementation of the present invention, and the present invention is not intended to be limited to the provided example.

Nearness function 600 accepts target identifiers 601-605 and targetMap index 608, which are inputted into hash function 610 and hash function 612, respectively. Hash function 610 produces a set of hash values 614, while hash function 612 produces hash value 616. Each hash value 614 is generated from a single target identifier as input to hash function 610. Each hash value 614 is then separately hashed together with hash value 616 by hash function 618, which produces a single nearness value. After executing hash function 618 for each hash value 614, a set of nearness values 620 is produced. Nearness values 620 are then compared to each other by comparator 622 to determine nearness value 624, which is a single nearness value generated from using one of the target identifiers 601-605 as an input.

Comparator 622 may employ one of a variety of comparison functions that are appropriate to the hash values to be compared. For example, if the resulting hash values are best interpreted as integers, then comparator 622 may determine that the best nearness value is the greatest integer nearness value, thereby producing the "nearest" value.

Each of the computed nearness values is computed from the targetMap index and a single target identifier. Since each target identifier is associated with a single target, nearness value 624 determines which target is "nearest" to the targetMap entry identified by the targetMap index.

As shown in FIG. 6, nearness function 600 accepts multiple target identifiers and produces a single nearness value after comparing the computed nearness values for the multiple target identifiers. Alternatively, an application may repeatedly invoke a nearness function with different target identifiers upon each invocation as inputs; the nearness function may accept a single target identifier and a targetMap index and then produce a single nearness value. In that case, the application could store a computed nearness value after each invocation and then perform its own comparison to determine the nearest value among the computed nearness values. As another alternative, the application could perform a running comparison among the computed nearness values, as was shown within FIG. 4C.

It should be noted that hash functions 610 and 612 may or may not be mathematically or computationally similar, and hash function 618 may or may not be mathematically or computationally similar to hash functions 610 and 612. It should also be noted that the number of target identifiers may vary, and the input associated with the targetMap may be some other type of unique identifier other than a table index that depends on the form of the targetMap data structure, as previously explained.

Given a goal of using the present invention in a distributed computing environment, the stable hash computation methodology should produce identical results on different types of computer platforms. While certain computational functions are easy to reproduce on a variety of computer platforms, other functions, such as hash functions, are sometimes not straightforwardly reproduced.

Generally, an application developer has a choice of multiple sources for hash functions: a hash function supplied by a programming language environment; a hash function supplied by an operating system; a hash function supplied by a mathematical library of routines; or a hash function written by the developer. Some of these hash functions employ idiosyncrasies of the computer hardware on which they execute. Hence, hash functions can vary greatly in their implementations across computer platforms.

The present invention relies upon a hash function to map an inputted key to the targetMap. In addition, the nearness function has requirements similar to a hash function in that the nearness function should produce a fair, even distribution of targetMap indices across the range of targets, i.e. across the target ID space. In fact, as shown in FIG. 6, an implementation of a nearness function can employ one or more hash functions. Therefore, in order to ensure that the present invention produces identical results on different types of computer platforms, significant effort should be given to obtaining a hash function and a nearness function that produces identical results on different computer platforms.

Java™ is a standard that supports a "write once, run anywhere" methodology. Hence, one manner of obtaining consistent results is to implement the present invention in a Java environment. Various routines for the stable hash computation can be written in the Java programming language and then executed within a Java runtime environment. Java source code may rely upon the fact that the Java specification provides a standard process for handling arithmetic operations such that the implemented functions will execute with identical results on different computer platforms while maintaining the exact same mapping. This feature allows the mapping methodology of the present invention to be scaled to a capacity beyond that of a single computer.

The advantages of the present invention should be apparent in view of the detailed description of the invention that is provided above. The present invention maps keys from a source ID space to targets in a dynamically varying target ID space. The mapping distributes the keys across the targets in the target set in a nearly uniform manner that is independent of the value characteristics of the source ID space, the target ID space, or the size of the target ID space.

The mapping may be employed in a variety of computational problems and contexts. For example, the present invention may be employed in a storage application in which requests for content, identifiable by Uniform Resource Identifiers (URIs) or URLs, are routed to a particular cache server based on the outcome of the stable hash computation. As another example, the present invention may be used within a network router; a destination address, such as an Internet Protocol (IP) address, from a network packet may be used as the input key, and the packet is routed to a next-hop destination based on the outcome of the stable hash computation.

The mapping is stable over the set of targets in the following way. If a target is removed from the target set, then only the mappings of keys to that target are changed, and all other keys continue to be mapped as they were before the target was removed. The keys that were mapped to the removed target are uniformly distributed over the remaining targets so that an overall uniform distribution is maintained. If a target is added to the target set, then only a proportional number of keys will be mapped to the new target, and all other keys will continue to be mapped as they were before the addition. The keys that will be mapped to the new target will be uniformly selected from all the previous targets so that an overall uniform distribution is maintained. The mapping of keys to targets is independent of the sequence in which the targets were added to the target set. In other words, the mapping of keys to a particular target set will be the same independent of the order in which the targets were added to the target set.

The mapping can be implemented such that it is independent of the computer platform on which the computation is executed. Therefore, this computation could be executed on a variety of different computers running different operating systems, and it would produce the same results. This implies that the mapping can be used by a number of computers at the same time to produce consistent results without sharing information other than updates to the target set across the computers. In addition, the mapping functionality can be scaled to a capacity beyond that of a single computer.

The mapping of a key to a particular target takes a very small constant time that is independent of the size of the source ID space or the number of targets in the target set. The computation requires memory resources that are linearly proportional to the maximum number of targets that can be in the target set and constant with respect to the size of the source ID space or the number of keys that have been mapped or will be mapped. Hence, the mapping functionality scales well because its computational cost is independent of the number of targets in the target set.

In addition, the methodology provided by the present invention can take into account the "capacity" of each target and map keys to each target in proportion to the "capacity" of each target.

Because of its generality, the present invention may be used in a wide variety of applications that may require a stable hash computation for a dynamically varying target set.

It is important to note that while the present invention has been described in the context of a fully functioning data processing system, those of ordinary skill in the art will appreciate that the processes of the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A routing method in a data processing system comprising the steps of:
   receiving a data packet;
   retrieving a destination address from the data packet;
   hashing the destination address to determine a table index into a table in a computer readable medium;
   reading a target address from a table entry using the table index, wherein the target address has been related to and stored in the table entry based on a computed value from a relation computation using the table index and the target address as operands in the relation computation;
   modifying the data packet by storing the target address in the data packet; and
   transmitting the modified data packet.

2. The method of claim 1 further comprising a step of relating a particular table entry to a target address in which:
   for each target address in the set of target addresses, generating a computed value using the table index for the particular entry and a target address as operands in the relation computation to obtain a set of computed values;
   choosing a computed value from the set of computed values based upon a mathematical relationship among the set of computed values; and
   determining a related target address for the particular entry based on the chosen computed value, wherein the chosen computed value was computed using the related-target address as input.

3. The method of claim 2 further comprising:
   obtaining a set of target addresses;
   for each table entry, relating a target address from the set of target addresses to a table entry such that each table entry is related with only one target address; and
   for each table entry, storing in a table entry the target address related with the table entry.

4. A method in a data processing system for mapping a source identifier to a target identifier in a set of target identifiers, the method comprising the steps of:
   managing, using a processor, a data structure in a computer readable medium, wherein each entry in the data structure stores information associated with a single target identifier and wherein a single target identifier is related to at least one entry location in the data structure;
   hashing, using the processor, the source identifier to a location identifier of an entry in the data structure;
   retrieving, using the processor, information associated with the target identifier from the entry in the data structure using the location identifier;
   obtaining, using the processor, a mapped target identifier from the retrieved information associated with the target identifier; and
   obtaining a source identified by the source identifier using a target identified by the mapped target identifier in a distributed computing environment;
   wherein a processing speed with which the source identifier is mapped to the mapped target identifier is independent of a total number of target identifiers in the set of target identifiers.

5. The method of claim 4, wherein the method for mapping the source identifier to the target identifier is stable with respect to changes in the set of target identifiers.

6. A method in a data processing system for mapping a source identifier to a target identifier, the method comprising the steps of:
   hashing, using a processor, the source identifier to determine a table index into a table in a computer readable medium;
   reading, using the processor, the target identifier from a table entry in the table using the table index, wherein the target identifier has been related to and stored in the table entry based on a computed value from a relation computation using the table index and the target identifier as operands in the relation computation; and
   reading a source identified by the source identifier using a target identified by the target identifier in a distributed computing environment.

7. The method of claim 6, wherein the target identifier is in a set of target identifiers, further comprising a step of the processor relating a particular table entry in the table to a target identifier in the set of target identifiers in which:
   for each target identifier in the set of target identifiers, generating a computed value using the table index for the particular table entry and a target identifier as operands in the relation computation to obtain a set of computed values;

choosing a computed value from the set of computed values based upon a mathematical relationship among the set of computed values; and determining a related target identifier for the particular entry based on the chosen computed value, wherein the chosen computed value was computed using the related target identifier as input.

8. The method of claim 7, further comprising, prior to the step of the processor reading the target identifier from the table entry:

obtaining, using the processor, a set of target identifiers;

for each table entry in the table, relating, using the processor, a target identifier from the set of target identifiers to a table entry such that each table entry is related with only one target identifier; and for each table entry, storing, using the processor, in a table entry the target identifier related with the table entry.

9. The method of claim 7, further comprising:

dynamically removing, using the processor, a target identifier from a set of target identifiers to obtain a modified set of target identifiers;

for each table entry in the table previously related to the removed target identifier, newly relating, using the processor, a target identifier from the modified set of target identifiers to a table entry in the table such that each table entry is related with only one target identifier; and for each table entry in the table previously related to the removed target identifier, storing, using the processor, in a table entry the target identifier newly related with the table entry.

10. The method of claim 7, further comprising:

dynamically adding, using the processor, a target identifier to a set of target identifiers to obtain a modified set of target identifiers;

for each table entry in the table, relating, using the processor, a target identifier from the modified set of target identifiers to a table entry such that each table entry is related with only one target identifier; and for each table entry in the table, storing, using the processor, in a table entry the target identifier related with the target entry if the target identifier related with the target entry differs from a target identifier previously stored in the table entry.

11. The method of claim 6, wherein the relation computation further comprises:

receiving, using the processor, the table index and the target identifier as operands for the relation computation;

hashing, using the processor, the table index to generate a first hash value;

hashing, using the processor, the target identifier to generate a second hash value; and hashing, using the processor, the first hash value and the second hash value to generate the computed value.

12. The method of claim 6, further comprising:

obtaining, using the processor, a set of target identifiers, wherein each target identifier in the set of target identifiers identifies a computational resource such that each target identifier is related with only one computational resource.

13. The method of claim 6, further comprising:

associating, using the processor, a computational resource with a subset of a set of target identifiers, wherein each target identifier in the set of target identifiers is related with only one computational resource, wherein each target identifier in the subset of target identifiers identifies the computational resource, and wherein a size of the subset of target identifiers is proportional to a computational capacity of the computational resource.

14. The method of claim 6, wherein the source identifier is a network protocol address.

15. The method of claim 6, wherein the target identifier is a network physical address.

16. The method of claim 6, wherein the target identifier is a Uniform Resource Identifier (URI).

17. A method in a data processing system for mapping a source identifier to a target identifier, the method comprising steps of:

hashing, using the processor, the source identifier to determine a location identifier of an entry in a data structure in a computer readable medium;

reading, using the processor, information associated with the target identifier from the entry in the data structure using the location identifier, wherein the information associated with the target identifier has been related to and stored in the entry based on a computed value from a relation computation using the location identifier and the target identifier as operands in the relation computation; and reading a source identified by the source identifier using a target identified by the target identifier in a distributed computing environment.

18. The method of claim 17, wherein the target identifier is in a set of target identifiers, further comprising a step of the processor relating a particular entry in the data structure to a target identifier in the set of target identifiers in which:

for each target identifier in the set of target identifiers, generating a computed value using the location identifier of the particular entry in the data structure and a target identifier as operands in the relation computation to obtain a set of computed values;

choosing a computed value from the set of computed values based upon a mathematical relationship among the set of computed values; and determining a related target identifier for the particular entry based on the chosen computed value, wherein the chosen computed value was computed using the related target identifier as input.

19. The method of claim 18, further comprising, prior to the step of reading the information associated with the target identifier from the entry in the data structure:

obtaining, using the processor, a set of target identifiers;

for each entry in the data structure, relating, using the processor, a target identifier from the set of target identifiers to an entry in the data structure such that each entry in the data structure is related with only one target identifier; and for each entry in the data structure, storing, using the processor, in an entry information associated with the target identifier related with the entry.

20. The method of claim 18, further comprising:

dynamically removing, using the processor, a target identifier from a set of target identifiers to obtain a modified set of target identifiers;

for each entry in the data structure previously related to the removed target identifier, newly relating, using the processor, a target identifier from the modified set of target identifiers to an entry in the data structure such that each entry in the data structure is related with only one target identifier; and for each entry in the data structure previously related to the removed target identifier, storing, using the processor, in an entry information associated with the target identifier newly related with the entry.

21. The method of claim 18, further comprising:
dynamically adding, using the processor, a target identifier to a set of target identifiers to obtain a modified set of target identifiers;
for each entry in the data structure, relating, using the processor, a target identifier from the modified set of target identifiers to an entry in the data structure such that each entry in the data structure is related with only one target identifier; and
for each entry in the data structure, storing, using the processor, in an entry information associated with the target identifier related with the entry if the target identifier related with the entry differs from a target identifier previously related to the entry in the data structure.

22. The method of claim 17, wherein the relation computation further comprises:
receiving, using the processor, the location identifier and the target identifier as operands for the relation computation;
hashing, using the processor, the location identifier to generate a first hash value;
hashing, using the processor, the target identifier to generate a second hash value; and
hashing, using the processor, the first hash value and the second hash value to generate the computed value.

23. The method of claim 17, further comprising:
obtaining, using the processor, a set of target identifiers, wherein each target identifier in the set of target identifiers identifies a computational resource such that each target identifier is related with only one computational resource.

24. The method of claim 17, further comprising:
associating, using the processor, a computational resource with a subset of a set of target identifiers, wherein each target identifier in the set of target identifiers is related with only one computational resource, wherein each target identifier in the subset of target identifiers identifies the computational resource, and wherein a size of the subset of target identifiers is proportional to a computational capacity of the computational resource.

25. The method of claim 17, further comprising:
retrieving, using the processor, the target identifier using the information associated with the target identifier; and
performing, using the processor, a computational process on a computational resource identified by the target identifier.

26. The method of claim 25, wherein the computational resource identified by the target identifier is a memory resource.

27. The method of claim 25, wherein the computational resource identified by the target identifier is a data processing system.

28. The method of claim 17, wherein the information associated with the target identifier comprises the target identifier.

29. The method of claim 17, wherein the data structure is a table, and the location identifier is a table index.

30. The method of claim 17, wherein the source identifier is a network protocol address.

31. The method of claim 17, wherein the target identifier is a network physical address.

32. The method of claim 17, wherein the target identifier is a Uniform Resource Identifier (URI).

33. A data processing system that enables a mapping of a source identifier to a target identifier, the data processing system comprising;
a processor; and
a memory comprising instructions, which when executed by the processor, perform actions comprising:
hashing the source identifier to determine a location identifier of an entry in a data structure in a computer readable medium;
reading information associated with the target identifier from the entry in the data structure using the location identifier, wherein the information associated with the target identifier has been related to and stored in the entry based on a computed value from a relation computation using the location identifier and the target identifier as operands in the relation computation; and
reading a source identified by the source identifier using a target identified by the mapped target identifier in a distributed computing environment.

34. The data processing system of claim 33, wherein the target identifier is in a set of target identifiers, further comprising first relating means for relating a particular entry in the data structure to a target identifier in the set of target identifiers wherein:
generating, for each target identifier in the set of target identifiers, a computed value using the location identifier of the particular entry in the data structure and a target identifier as operands in the relation computation to obtain a set of computed values;
choosing a computed value from the set of computed values based upon a mathematical relationship among the set of computed values; and
determining a related target identifier for the particular entry based on the chosen computed value, wherein the chosen computed value was computed using the related target identifier as input.

35. The data processing system of claim 34, further comprising, prior to the step of reading the information associated with the target identifier from the entry in the data structure:
obtaining a set of target identifiers;
relating, for each entry in the data structure, a target identifier from the set of target identifiers to an entry in the data structure such that each entry in the data structure is related with only one target identifier; and
storing, in each entry in the data structure, information associated with its related the target identifier related with the table entry.

36. The data processing system of claim 34, further comprising:
dynamically removing a target identifier from a set of target identifiers to obtain a modified set of target identifiers;
newly relating, for each entry in the data structure previously related to the removed target identifier, a target identifier from the modified set of target identifiers to an entry in the data structure such that each entry in the data structure is related with only one target identifier; and
storing, in each entry in the data structure previously related to the removed target identifier, information associated with the target identifier newly related with the table entry.

37. The data processing system of claim 34, further comprising:
dynamically adding a target identifier to a set of target identifiers to obtain a modified set of target identifiers;
relating, for each entry in the data structure, a target identifier from the modified set of target identifiers to an entry in the data structure such that each entry in the data structure is related with only one target identifier; and storing, in each entry in the data structure, information associated with the target identifier related with the entry if the target identifier related with the entry differs from a target identifier previously related to the entry in the data structure.

38. The data processing system of claim 33, wherein the relation computation further comprises:

receiving the location identifier and the target identifier as operands for the relation computation;

hashing the location identifier to generate a first hash value;

hashing the target identifier to generate a second hash value; and hashing the first hash value and the second hash value to generate the computed value.

39. The data processing system of claim 33, further comprising:

obtaining a set of target identifiers, wherein each target identifier in the set of target identifiers identifies a computational resource such that each target identifier is related with only one computational resource.

40. The data processing system of claim 39, wherein the computational resource identified by the target identifier is a memory resource.

41. The data processing system of claim 39, wherein the computational resource identified by the target identifier is a router.

42. The data processing system of claim 33, further comprising:

associating a computational resource with a subset of a set of target identifiers, wherein each target identifier in the set of target identifiers is related with only one computational resource, wherein each target identifier in the subset of target identifiers identifies the computational resource, and wherein a size of the subset of target identifiers is proportional to a computational capacity of the computational resource.

43. The data processing system of claim 33, further comprising:

retrieving the target identifier using the information associated with the target identifier; and performing a computational process on a computational resource identified by the target identifier.

44. The data processing system of claim 33, wherein the information associated with the target identifier comprises the target identifier.

45. The data processing system of claim 33, wherein the data structure is a table, and the location identifier is a table index.

46. The data processing system of claim 33, wherein the source identifier is a network protocol address.

47. The data processing system of claim 33, wherein the target identifier is a network physical address.

48. The data processing system of claim 33, wherein the target identifier is a Uniform Resource Identifier (URI).

49. A computer program product comprising:

a non-transitory computer readable medium including instructions, which when executed in a data processing system, map a source identifier to a target identifier, the instructions including:

instructions for hashing the source identifier to determine a location identifier of an entry in a data structure in a computer readable medium;

instructions for reading information associated with the target identifier from the entry in the data structure using the location identifier, wherein the information associated with the target identifier has been related to and stored in the entry based on a computed value from a relation computation using the location identifier and the target identifier as operands in the relation computation; and instructions for reading a source identified by the source identifier to use a target identified by the target identifier in a distributed computing environment.

50. The computer program product of claim 49, wherein the target identifier is in a set of target identifiers, and further comprising instructions relating a particular entry in the data structure to a target identifier in the set of target identifiers including:

instructions for generating, for each target identifier in the set of target identifiers, a computed value using the location identifier of the particular entry in the data structure and a target identifier as operands in the relation computation to obtain a set of computed values;

instructions for choosing a computed value from the set of computed values based upon a mathematical relationship among the set of computed values; and instructions for determining a related target identifier for the particular entry based on the chosen computed value, wherein the chosen computed value was computed using the related target identifier as input.

51. The computer program product of claim 50, further comprising:

instructions for obtaining a set of target identifiers;

instructions for relating, for each entry in the data structure, a target identifier from the set of target identifiers to an entry in the data structure such that each entry in the data structure is related with only one target identifier; and instructions for storing, in each entry in the data structure, information associated with the target identifier related with the entry.

52. The computer program product of claim 50, further comprising:

instructions for dynamically removing a target identifier from a set of target identifiers to obtain a modified set of target identifiers;

instructions for newly relating, for each entry in the data structure previously related to the removed target identifier, a target identifier from the modified set of target identifiers to an entry in the data structure such that each entry in the data structure is related with only one target identifier; and instructions for storing, in each entry in the data structure previously related to the removed target identifier, information associated with the target identifier newly related with the entry.

53. The computer program product of claim 50, further comprising:

instructions for dynamically adding a target identifier to a set of target identifiers to obtain a modified set of target identifiers;

instructions for relating, for each entry in the data structure, a target identifier from the modified set of target identifiers to an entry in the data structure such that each entry in the data structure is related with only one target identifier; and instructions for storing, in each entry in the data structure, information associated with the target identifier related with the entry if the target identifier related with the entry differs from a target identifier previously related to the entry in the data structure.

54. The computer program product of claim 49, wherein the relation computation further comprises:

instructions for receiving the location identifier and the target identifier as operands for the relation computation;

instructions for hashing the location identifier to generate a first hash value;

instructions for hashing the target identifier to generate a second hash value; and instructions for hashing the first hash value and the second hash value to generate the computed value.

55. The computer program product of claim 49, further comprising:

instructions for obtaining a set of target identifiers, wherein each target identifier in the set of target identifiers identifies a computational resource such that each target identifier is related with only one computational resource.

56. The computer program product of claim 55, wherein the computational resource identified by the target identifier is a memory resource.

57. The computer program product of claim 55, wherein the computational resource identified by the target identifier is a data processing system.

58. The computer program product of claim 49, further comprising:

instructions for associating a computational resource with a subset of a set of target identifiers, wherein each target identifier in the set of target identifiers is related with only one computational resource, wherein each target identifier in the subset of target identifiers identifies the computational resource, and wherein a size of the subset of target identifiers is proportional to a computational capacity of the computational resource.

59. The computer program product of claim 49, further comprising:

instructions for retrieving the target identifier using the information associated with the target identifier; and instructions for performing a computational process on a computational resource identified by the target identifier.

60. The computer program product of claim 49, wherein the information associated with the target identifier comprises the target identifier.

61. The computer program product of claim 49, wherein the data structure is a table, and the location identifier is a table index.

62. A routing method in a data processing system comprising the steps of:

receiving a data packet;

retrieving a destination address from the data packet;

hashing the destination address to determine a table index into a table in a computer readable medium;

reading a target address from a table entry using the table index, wherein the target address has been related to and stored in the table entry based on a computed value from a relation computation using the table index and the target address as operands in the relation computation, wherein the relation computation is a nearness function;

modifying the data packet by storing the target address in the data packet; and transmitting the modified data packet.

63. The method of claim 62, further comprising a step of relating a particular table entry to a target address in which:

for each target address in the set of target addresses, generating a computed value using the table index for the particular entry and a target address as operands in the relation computation to obtain a set of computed values;

choosing a computed value from the set of computed values based upon a mathematical relationship among the set of computed values; and determining a related target address for the particular entry based on the chosen computed value, wherein the chosen computed value was computed using the related-target address as input.

64. The method of claim 63, further comprising:

obtaining a set of target addresses;

for each table entry, relating a target address from the set of target addresses to a table entry such that each table entry is related with only one target address; and for each table entry, storing in a table entry the target address related to the table entry.

* * * * *